United States Patent [19]

Utsumi et al.

[11] 3,912,527
[45] Oct. 14, 1975

[54] BARIUM TITANATE BASE CERAMIC COMPOSITION HAVING A HIGH DIELECTRIC CONSTANT

[75] Inventors: Kazuaki Utsumi; Norio Tsubouchi; Tomeji Ohno, all of Tokyo, Japan

[73] Assignee: Nippon Electric Company, Limited, Tokyo, Japan

[22] Filed: Mar. 22, 1974

[21] Appl. No.: 453,998

[30] Foreign Application Priority Data

| | | |
|---|---|---|
| Mar. 24, 1973 | Japan | 48-33896 |
| May 9, 1973 | Japan | 48-51996 |
| Feb. 20, 1974 | Japan | 49-20303 |
| Feb. 22, 1974 | Japan | 49-21225 |

[52] U.S. Cl. ............ 106/73.32; 106/73.31; 252/520
[51] Int. Cl.$^2$ .................... C04B 35/46; H01B 1/08
[58] Field of Search......... 106/73.31, 73.32, DIG. 5; 252/520

[56] References Cited

UNITED STATES PATENTS

| | | | |
|---|---|---|---|
| 2,331,444 | 10/1943 | Wainer | 106/73.32 X |
| 2,836,501 | 5/1958 | Crownover | 106/73.32 |
| 2,980,546 | 4/1961 | Plessner et al. | 106/73.31 |
| 3,373,120 | 3/1968 | Nitta et al. | 106/73.32 X |
| 3,473,958 | 10/1969 | Waku | 106/73.31 X |
| 3,474,043 | 10/1969 | Andersen et al. | 106/73.31 X |
| 3,523,028 | 8/1970 | Prokopowicz | 106/73.31 |
| 3,529,978 | 9/1970 | Taylor et al. | 106/73.31 |
| 3,586,642 | 6/1971 | Matsuo et al. | 106/73.32 X |
| 3,666,505 | 5/1972 | Hoffmann et al. | 106/73.32 X |
| 3,788,867 | 1/1974 | Rutt | 106/73.31 |

FOREIGN PATENTS OR APPLICATIONS

| | | | |
|---|---|---|---|
| 755,860 | 8/1956 | United Kingdom | 106/46 |

OTHER PUBLICATIONS

"Three-Step Positive Temperature Coefficient of Resistivity...," Kuwabara et al., CA 79: 71231t, (1973).

*Primary Examiner*—Allen B. Curtis
*Assistant Examiner*—Thomas A. Waltz
*Attorney, Agent, or Firm*—Hopgood, Calimafde, Kalil, Blaustein & Lieberman

[57] ABSTRACT

A ceramic composition having a high dielectric constant which has good stability with temperature variation and the passage of time includes $BaTiO_3$ in which the molecular ratio of Ba to Ti ranges from about 0.9 to 1.1 as the basic constituent and about 0.1 to 10 mol % of at least one compound selected from the group of $Nb_2O_5$ and $Ta_2O_5$ and about 0.01 to 15 mol % of at least one compound selected from the group consisting of $In_2O_3$, $Ga_2O_3$, $Tl_2O_3$, MgO, ZnO and NiO as sub constituents.

8 Claims, No Drawings

BARIUM TITANATE BASE CERAMIC COMPOSITION HAVING A HIGH DIELECTRIC CONSTANT

BACKGROUND OF THE INVENTION

The present invention relates to ceramic compositions containing $BaTiO_3$ as the basic composition, and particularly to such ceramic compositions having a high dielectric constant and in which the dielectric constant remains substantially stable despite temperature variation and the passage of time.

Ceramic compositions having the above described properties are suitable for use in various electronic devices, such as for instance ceramic capacitors. In order to be practical for use in ceramic capacitors, it is desirable that a material have a dielectric constant ($\epsilon$) of up to 2,000. The dielectric constant should remain relatively stable over a wide temperature range, for example, from minus 55°C to plus 125°C and should have good stability over the passage of time. It is also desirable that the dielectric loss ($\tan\delta$) of the material be low.

In order to fulfill these requirements, a variety of compositions have heretofore been prepared. Most of these prior art compositions, however, have only had a dielectric constant which was stable with reference to either temperature or time. Moreover, the temperature range of good dielectric constant stability has been very narrow, so that practical applications have been quite limited.

It has been recently found that ceramic compositions containing barium titanate ($BaTiO_3$) as the basic component and Ce, La and Bi as additives have a good temperature stability of their dielectric constant over a temperature range of −55°C to +125°C. The stability of the dielectric constant of such materials is also good with respect to time. This fact is reported in detail, for example, by Johannes Just, in an article entitled "Eigenschaften von hochtemperaturbeständigen Sonderkeramiken mit hoher Dielektrizitätskonstante," which appeared in 'Technische Mitteilungen AEG-Telefunken Gesellschaft', Vol. 60 No. 2, pages 125–126 (1970). However, in compositions of the type described in this article having dielectric constants which have good stability with respect to time and temperature, the dielectric constant is degraded to below 1,000 in value. Moreover, since Bi which has a high vapor pressure and is very reactive is contained in these compositions, it is difficult to use them in the manufacture of ceramics. When for instance these compositions are used to manufacture a laminated ceramic capacitor, internal electrodes made of platinum or palladium are noticeably corroded.

An object of the present invention is to eliminate the disadvantages mentioned above.

Another object of the present invention is to provide ceramic compositions which have a high dielectric constant and exhibit good temperature stability over a wide temperature range together with good time stability.

A further object of the present invention is to provide ceramic compositions which contain $BaTiO_3$ as a basic composition but contain no Bi, so that capacitor manufacture using these compositions is facilitated and these compositions provide an optimum material for the manufacture of, for instance, laminated ceramic capacitors.

SUMMARY OF THE INVENTION

The ceramic compositions of the present invention contain $BaTiO_3$ as the basic constituent, in which the molecular ratio of Ba to Ti is within the range from about 0.9 to 1.1. These compositions further contain about 0.1 to 10 mol % of at least one compound selected from the group consisting of $Nb_2O_5$ and $Ta_2O_5$ and about 0.01 to 15 mol % of at least one compound selected from the group consisting of $In_2O_3$, $Ga_2O_3$, $Tl_2O_3$, MgO, ZnO, and NiO as sub constituents. If desired, compositions within the above composition ranges may also contain about 0.01 to 10 mol % of $Al_2O_3$ as another sub constituent to provide even greater improvement in both the temperature stability and the time stability of the dielectric constant.

DESCRIPTION OF THE INVENTION

The ceramic compositions of the present invention have $BaTiO_3$ as their basic constituent. The $BaTiO_3$ is manufactured so that the molecular ratio of Ba to Ti is within the range of about 0.9 to 1.1. In addition, these ceramic compositions contain about 0.1 to 10 mol % of at least one of $Nb_2O_5$ and $Ta_2O_5$ and about 0.01 to 15 mol % of at least one of $In_2O_3$, $Ga_2O_3$, $Tl_2O_3$, MgO, ZnO, and NiO as sub constituents. These compositions may also contain about 0.01 to 10 mol % of $Al_2O_3$ as a further sub constituent.

If the content of $Nb_2O_5$ and/or $Ta_2O_5$ is less than 0.1 mol % in these ceramic compositions, $\tan\delta$ will become large. While, if the content of $Nb_2O_5$ and/or $Ta_2O_5$ is more than 10 mol % or if the content of one or more of $In_2O_3$, $Ga_2O_3$, $Tl_2O_3$, MgO, ZnO and NiO is less than 0.01 mol %, the temperature stability of the dielectric constant will be degraded. If the content of one or more of $In_2O_3$, $Ga_2O_3$, $Tl_2O_3$, MgO, ZnO and NiO is more than 15 mol % or if the content of $Al_2O_3$ is more than 10 mol %, the value of the dielectric constant will become low, e.g., below 1,500.

According to a first example of the present invention, a ceramic composition is made containing $BaTiO_3$, about 0.1 to 10 mol % and preferably about 0.5 to 5.0 mol %, of $Nb_2O_5$ and/or $Ta_2O_5$ and about 0.01 to 15 mol % and preferably about 0.05 to 5.0 mol % of at least one of $In_2O_3$, $Ga_2O_3$, and $Tl_2O_3$. Less than 10 mol %, and preferably about 0.5 to 5.0 mol % $Al_2O_3$ may be added to the composition. It is preferable that the total amount of sub constituents in the composition be about 1.05 to 10 mol %.

According to a second example of the present invention, a ceramic composition contains $BaTiO_3$, about 0.1 to 10 mol % and preferably about 0.5 to 5.0 mol % of $Nb_2O_5$ and/or $Ta_2O_5$, about 0.001 to 10 mol % and preferably about 0.5 to 5.0 mol % of MgO, ZnO, or NiO, and about 0.1 to 10 mol % and preferably about 0.5 to 5.0 mol % of $Al_2O_3$. This composition may also contain at least one of $TiO_2$, $SiO_2$, $SnO_2$, $GeO_2$ and $ZrO_2$ in an amount of about 0.01 to 10 mol % and preferably about 0.1 to 5.0 mol %. It is preferable that the total amount of sub constituents in the composition be about 1.6 to 10.0 mol %.

The ceramic compositions of the present invention have a high dielectric constant which is for example in the range of 1,500 to 3,500. The dielectric constant of these compositions has good stability over a wide temperature range, varying only in the range of +15% to −20% over a temperature range of −55°C to +125°C The dielectric constant of these compositions also has good stability with respect to time.

As starting materials for making the basic constituent of the ceramic compositions of the present invention, $BaCO_3$ and $TiO_2$ powders of at least 99% purity were used. Powders of $Nb_2O_5$, $Ta_2O_5$, $In_2O_3$, $Ga_2O_3$, $Tl_2O_3$, $Al_2O_3$, MgO, ZnO, NiO, $TiO_2$, $SnO_2$, $SiO_2$, $GeO_2$, and $ZrO_2$ of at least 99% purity were employed as the subconstituents. The $BaCO_3$ and $TiO_2$ were added together in equal mols, and were mixed by means of a ball mill. This mixture was thereafter pre-sintered at 1,000° to 1,200°C. It was determined by the powder X-ray diffraction method that the pre-sintering caused the powder to be thoroughly transformed into $BaTiO_3$. The pre-sintered $BaTiO_3$ powder and the starting materials of subconstituents were weighed to obtain the necessary quantities, and were mixed by means of a ball mill. After filtration and drying, the mixture was pressure-molded into discs having a diameter of 16mm. These discs were sintered then at 1,300° to 1,450°C for 1 hour.

Silver electrodes were then provided on both the principal surfaces of the resultant ceramic discs by burning at 600°C. The dielectric constant ($\epsilon$) and the dielectric loss ($\tan\delta$) were then measured with a capacitance bridge by applying an alternating current of 1 KHz to the ceramic discs at a temperature of 20°C. The temperature stability of the dielectric constant was estimated by measuring it at various temperatures within the range of −55°C and +125°C and calculating the rate of temperature variation of the dielectric constant with reference to the value of the dielectric constant at +20°C. The temperature stability of the dielectric constant can then be represented by:

$$\frac{\epsilon_{max} - \epsilon_{20}}{\epsilon_{20}} \times 100 \text{ to } \frac{\epsilon_{min} - \epsilon_{20}}{\epsilon_{20}} \times 100,$$

where $\epsilon_{20}$ denotes the value of $\epsilon$ at +20°C, while $\epsilon_{max}$ and $\epsilon_{min}$ respectively denote the maximum and the minimum values of the dielectric constant within the temperature range of −55°C to +125°C.

In order to estimate the time stability of the dielectric constant, the value of the dielectric constant was measured several times over a period of time from 12 hours to 1,000 hours after the provision of the silver electrodes by burning. The rate of variation ($A_\epsilon$) of the dielectric constant with respect to time was calculated by the following equation:

$$\frac{\epsilon_t - \epsilon_{t_0}}{\epsilon_{t_0}} \times 100 = A_\epsilon \cdot \log(t/12),$$

where
t: elapsed time,
$\epsilon_{t_0}$: the value of $\epsilon$ at a time 12 hours after the provision of the electrodes by burning, and $\epsilon_t$: the value of $\epsilon$ after an elapsed time of $t$ hours.

Typical examples of the results obtained are listed in Tables 1, 2 and 3. Specimens shown with an asterisk in the tables are compositions outside the scope of the present invention.

Table 1

| Specimen No. | Composition (mol %) | | | | | | | $\epsilon$ [20°C] | $\tan \delta$ (%) [20°C] | rate of temp. variation of $\epsilon$ (%) [−55°C to +125°C] | rate of time variation of $\epsilon$ [$A_\epsilon$] (%/decade) |
|---|---|---|---|---|---|---|---|---|---|---|---|
| | $BaTiO_3$ | $Nb_2O_5$ | $Al_2O_3$ | Other Subconstituents | | | | | | | |
| 1* | 95 | 2.5 | 2.5 | — | — | — | — | 3130 | 6.40 | +4 ~ −42 | −1.5 |
| 2* | 96 | 2.5 | 1.5 | — | — | — | — | 2310 | 0.78 | +19 ~ −30 | −1.0 |
| 3* | 96.5 | 1.5 | 2.0 | — | — | — | — | 2770 | 0.36 | 0 ~ −40 | −0.8 |
| 4 | 96 | 1.5 | 2.49 | $In_2O_3$ | 0.01 | — | — | 2540 | 0.45 | 0 ~ −19 | −0.8 |
| 5 | 96 | 1.5 | 2.40 | " | 0.10 | — | — | 2450 | 0.40 | 0 ~ −16 | −1.2 |
| 6 | 96 | 1.5 | 2.25 | " | 0.25 | — | — | 2040 | 0.35 | +1 ~ −8 | −1.2 |
| 7 | 96 | 1.5 | 2.00 | " | 0.50 | — | — | 2270 | 0.55 | +15 ~ −10 | −1.0 |
| 8 | 96 | 1.5 | 1.50 | " | 1.00 | — | — | 1820 | 0.55 | +15 ~ −10 | −1.5 |
| 9 | 97 | 1.0 | — | " | 2.0 | — | — | 2620 | 0.40 | 0 ~ −16 | −1.1 |
| 10 | 99.79 | 0.1 | 0.1 | " | 0.01 | — | — | 2510 | 1.92 | +7 ~ −11 | −1.8 |
| 11 | 84.8 | 10.0 | 5.0 | " | 0.2 | — | — | 1980 | 0.98 | +10 ~ −6 | −0.7 |
| 12 | 77.5 | 5.0 | 2.5 | " | 15.0 | — | — | 1750 | 0.48 | +9 ~ −19 | −0.8 |
| 13 | 92.5 | 2.0 | 5.0 | " | 0.5 | — | — | 1510 | 0.36 | +8 ~ −6 | −1.3 |
| 14 | 96.7 | 2.0 | 1.0 | " | 0.3 | — | — | 3000 | 0.33 | +4 ~ −9 | −1.2 |
| 15 | 97.8 | 1.5 | 0.5 | " | 0.2 | — | — | 3100 | 0.41 | +8 ~ −10 | −1.0 |
| 16 | 78.0 | 7.0 | — | $Ga_2O_3$ | 15.0 | — | — | 1770 | 0.86 | +12 ~ −18 | −1.0 |
| 17 | 97.2 | 1.5 | 1.0 | " | 0.3 | — | — | 2200 | 0.42 | +4 ~ −10 | −1.2 |
| 18 | 97.2 | 1.5 | 1.2 | " | 0.1 | — | — | 2460 | 0.67 | 0 ~ −17 | −0.8 |
| 19 | 78.0 | 7.0 | — | $Tl_2O_3$ | 15.0 | — | — | 1650 | 0.79 | +11 ~ −18 | −0.9 |
| 20 | 97.2 | 1.5 | 1.0 | " | 0.3 | — | — | 2110 | 0.51 | +8 ~ −6 | −1.3 |
| 21 | 97.2 | 1.5 | 1.2 | " | 0.1 | — | — | 2300 | 0.39 | 0 ~ −13 | −1.0 |
| 22 | 94.0 | 2.5 | 3.0 | MgO | 0.5 | — | — | 2500 | 0.51 | +14 ~ −12 | −1.5 |
| 23 | 79.8 | 0.1 | 0.1 | " | 10.00 | $TiO_2$ | 10.0 | 3000 | 2.10 | +5 ~ −15 | −0.7 |
| 24 | 83.0 | 10.0 | 5.0 | " | 1.0 | " | 1.0 | 2530 | 1.00 | +13 ~ −14 | −1.0 |
| 25 | 83.0 | 5.0 | 10.0 | " | 1.0 | " | 1.0 | 2100 | 0.89 | +12 ~ −13 | −1.2 |
| 26 | 97.98 | 1.0 | 1.0 | " | 0.01 | " | 0.01 | 2300 | 0.43 | +3 ~ −15 | −1.5 |
| 27 | 95.0 | 2.5 | 1.5 | " | 0.5 | " | 0.5 | 1860 | 0.45 | +10 ~ −13 | −1.5 |
| 28 | 95.0 | 2.0 | 2.0 | " | 0.5 | " | 0.5 | 2560 | 0.50 | +12 ~ −9 | −1.2 |
| 29 | 94.5 | 1.0 | 1.5 | " | 1.5 | " | 1.5 | 1820 | 0.60 | +17 ~ −12 | −1.0 |
| 30 | 97.99 | 1.0 | 1.0 | ZnO | 0.01 | — | — | 2400 | 0.83 | +4 ~ −13 | −1.3 |
| 31 | 93.0 | 1.0 | 1.0 | ZnO | 2.5 | $TiO_2$ | 2.5 | 2750 | 0.90 | +6 ~ −13 | −1.0 |
| 32 | 92.0 | 1.0 | 1.0 | " | 3.0 | " | 3.0 | 2530 | 1.10 | +5 ~ −12 | −2.0 |
| 33 | 78.0 | 1.0 | 1.0 | " | 10.0 | " | 10.0 | 1650 | 0.53 | +7 ~ −11 | −1.0 |
| 34 | 93.5 | 2.5 | 2.0 | " | 1.0 | $SnO_2$ | 1.0 | 2300 | 0.73 | +9 ~ −10 | −1.5 |
| 35 | 78.0 | 1.0 | 1.0 | " | 10.0 | " | 10.0 | 1700 | 0.62 | +3 ~ −7 | −1.4 |
| 36 | 95.5 | 1.0 | 1.5 | " | 1.0 | $SiO_2$ | 1.0 | 2400 | 0.65 | +7 ~ −8 | −0.9 |
| 37 | 78.0 | 1.0 | 1.0 | " | 10.0 | " | 10.0 | 1730 | 0.55 | +9 ~ −4 | −0.7 |
| 38 | 95.5 | 1.0 | 1.5 | " | 1.0 | $GeO_2$ | 1.0 | 2630 | 0.43 | +10 ~ −7 | −1.3 |
| 39 | 78.0 | 1.0 | 1.0 | " | 10.0 | " | 10.0 | 1560 | 0.41 | +3 ~ −6 | −2.0 |
| 40 | 94.5 | 2.0 | 1.5 | " | 1.0 | $ZrO_2$ | 1.0 | 2120 | 0.81 | +4 ~ −10 | −1.7 |
| 41 | 78.0 | 1.0 | 1.0 | " | 10.0 | " | 10.0 | 1770 | 0.91 | +7 ~ −9 | −2.0 |

Table 1 -Continued

| Specimen No. | Composition (mol %) | | | | | | | $\epsilon$ [20°C] | tan δ (%) [20°C] | rate of temp. variation of $\epsilon$ (%) [−55°C to +125°C] | rate of time variation of $\epsilon$ [A$\epsilon$] (%/decade) |
|---|---|---|---|---|---|---|---|---|---|---|---|
| | $BaTiO_3$ | $Nb_2O_5$ | $Al_2O_3$ | Other Subconstituents | | | | | | | |
| 42 | 97.0 | 1.0 | 1.5 | NiO | 0.5 | — | — | 2440 | 0.83 | +3 ~ −11 | −0.7 |
| 43 | 95.98 | 2.0 | 2.0 | " | 0.01 | $TiO_2$ | 0.01 | 2510 | 0.75 | +4 ~ −9 | −1.2 |
| 44 | 95.0 | 1.5 | 1.5 | " | 1.0 | " | 1.0 | 2320 | 0.91 | +7 ~ −7 | −1.3 |
| 45 | 78.0 | 1.0 | 1.0 | " | 10.0 | " | 10.0 | 1600 | 1.01 | +11 ~ −4 | −1.1 |
| 46 | 97.99 | 1.0 | 1.0 | $In_2O_3$ | 0.005 | $Ga_2O_3$ | 0.005 | 2830 | 0.35 | +1 ~ −13 | −0.7 |
| 47 | 97.90 | 1.0 | 1.0 | " | 0.05 | " | 0.05 | 2540 | 0.41 | +3 ~ −11 | −1.1 |
| 48 | 97.75 | 1.0 | 1.0 | " | 0.125 | " | 0.125 | 2500 | 0.35 | +5 ~ −10 | −1.2 |
| 49 | 97.50 | 1.0 | 1.0 | " | 0.25 | " | 0.25 | 2380 | 0.51 | +8 ~ −9 | −0.9 |
| 50 | 97.00 | 1.0 | 1.0 | " | 0.5 | " | 0.5 | 2320 | 0.72 | +10 ~ −5 | −0.8 |
| 51 | 97.00 | 1.0 | — | " | 1.0 | " | 1.0 | 2330 | 0.63 | +5 ~ −8 | −1.0 |
| 52 | 99.79 | 0.01 | 0.1 | " | 0.05 | " | 0.05 | 2960 | 0.91 | +4 ~ −10 | −1.3 |
| 53 | 88.80 | 10.0 | 1.0 | " | 0.1 | " | 0.1 | 1820 | 0.21 | +1 ~ −13 | −0.7 |
| 54 | 83.90 | 1.0 | 0.1 | " | 7.5 | " | 7.5 | 1550 | 0.32 | +7 ~ −11 | −0.9 |
| 55 | 88.50 | 1.0 | 10.0 | " | 0.25 | " | 0.25 | 1920 | 0.43 | +5 ~ −10 | −0.8 |
| 56 | 97.70 | 1.5 | 0.5 | " | 0.15 | " | 0.15 | 2480 | 0.38 | +8 ~ −7 | −0.9 |
| 57 | 84.00 | 1.0 | — | $Tl_2O_3$ | 7.5 | " | 7.5 | 1630 | 0.55 | +3 ~ −14 | −1.1 |
| 58 | 97.20 | 1.5 | 1.0 | " | 0.15 | " | 0.15 | 2210 | 0.61 | +9 ~ −7 | −1.2 |
| 59 | 97.29 | 1.5 | 1.2 | " | 0.005 | " | 0.005 | 2350 | 0.48 | +2 ~ −12 | −0.7 |
| 60 | 84.00 | 1.0 | — | " | 7.5 | $In_2O_3$ | 7.5 | 1610 | 0.65 | +5 ~ −13 | −0.9 |
| 61 | 97.20 | 1.5 | 1.0 | " | 0.15 | " | 0.15 | 2280 | 0.54 | +7 ~ −9 | −0.8 |
| 62 | 97.29 | 1.5 | 1.2 | $Tl_2O_3$ | 0.005 | $In_2O_3$ | 0.005 | 2310 | 0.37 | +4 ~ −9 | −1.1 |
| 63 | 92.00 | 1.0 | — | " $Ga_2O_3$ | 2.0 2.0 | " | 3.0 | 2120 | 0.71 | 0 ~ −15 | −1.0 |
| 64 | 97.20 | 1.5 | 1.0 | $Tl_2O_3$ $Ga_2O_3$ | 0.1 0.17 | " | 0.03 | 2430 | 0.62 | +11 ~ −5 | −1.0 |
| 65 | 97.29 | 1.5 | 1.2 | $Tl_2O_3$ $Ga_2O_3$ | 0.002 0.005 | " | 0.003 | 2510 | 0.53 | +3 ~ −7 | −0.9 |

Table 2

| Specimen No. | Composition (mol %) | | | | | | $\epsilon$ [20°C] | tan δ (%) [20°C] | rate of temp. variation of $\epsilon$(%) [−55°C to +125°C] | rate of time variation of $\epsilon$[A$\epsilon$] (%/decade) |
|---|---|---|---|---|---|---|---|---|---|---|
| | $BaTiO_3$ | $Ta_2O_5$ | $Al_2O_3$ | $In_2O_3$ | $Ga_2O_3$ | $Tl_2O_3$ | | | | |
| 66* | 99.0 | 1.0 | — | — | — | — | 2800 | 4.8 | +30 ~ −40 | −3.0 |
| 67 | 98.99 | 1.0 | 0.01 | — | — | — | 2720 | 0.64 | 0 ~ −17 | −1.0 |
| 68 | 98.0 | 1.0 | 1.0 | — | — | — | 2540 | 0.35 | 0 ~ −20 | −1.6 |
| 69 | 84.0 | 1.0 | 1.5 | — | — | — | 1500 | 0.82 | +11 ~ −4 | −1.8 |
| 70 | 98.49 | 1.5 | — | 0.01 | — | — | 2380 | 0.67 | 0 ~ −13 | −1.5 |
| 71 | 97.5 | 1.5 | — | 1.0 | — | — | 2300 | 0.71 | +4 ~ −3 | −1.5 |
| 72 | 84.0 | 1.0 | — | 1.5 | — | — | 1510 | 0.73 | +3 ~ −6 | −1.7 |
| 73 | 98.49 | 1.5 | — | — | 0.01 | — | 2740 | 0.61 | +4 ~ −8 | −1.4 |
| 74 | 98.0 | 1.0 | — | — | 1.0 | — | 3190 | 0.65 | +11 ~ −4 | −2.0 |
| 75 | 84.0 | 1.0 | — | — | 1.5 | — | 1500 | 0.79 | +9 ~ −3 | −2.1 |
| 76 | 98.49 | 1.5 | — | — | — | 0.01 | 2710 | 0.84 | +5 ~ −9 | −0.9 |
| 77 | 97.5 | 1.5 | — | — | — | 1.0 | 2650 | 0.71 | +9 ~ −10 | −1.1 |
| 78 | 84.0 | 1.0 | — | — | — | 1.5 | 1530 | 0.62 | +10 ~ −12 | −1.3 |
| 79 | 98.87 | 0.1 | 1.0 | 0.03 | — | — | 2630 | 0.73 | +11 ~ −8 | −0.8 |
| 80 | 97.5 | 1.0 | 1.0 | 0.5 | — | — | 2410 | 0.52 | +8 ~ −9 | −1.1 |
| 81 | 96.47 | 1.5 | 2.0 | 0.03 | — | — | 2260 | 0.43 | +7 ~ −7 | −1.5 |
| 82 | 93.9 | 5.0 | 1.0 | 0.1 | — | — | 2080 | 0.44 | +3 ~ −12 | −1.6 |
| 83 | 88.9 | 10.0 | 1.0 | 0.1 | — | — | 1610 | 0.76 | +0 ~ −15 | −1.8 |
| 84 | 98.0 | 1.0 | 0.5 | — | 0.5 | — | 2580 | 0.71 | +0 ~ −14 | −2.0 |
| 85 | 97.5 | 1.0 | 1.0 | — | — | 0.5 | 2540 | 0.65 | +0 ~ −17 | −2.1 |
| 86 | 97.5 | 1.0 | — | — | 1.0 | 0.5 | 2420 | 0.56 | +3 ~ −13 | −1.3 |
| 87 | 98.0 | 1.0 | — | 0.5 | — | 0.5 | 2680 | 0.81 | +1 ~ −11 | −1.2 |
| 88 | 97.5 | 1.0 | — | 0.5 | 1.0 | — | 2370 | 0.77 | +2 ~ −11 | −1.5 |
| 89 | 97.47 | 1.0 | — | 0.03 | 1.0 | 0.5 | 2330 | 0.69 | +5 ~ −9 | −1.7 |
| 90 | 97.97 | 1.0 | 0.5 | — | 0.5 | 0.03 | 2410 | 0.53 | +4 ~ −12 | −1.9 |
| 91 | 97.47 | 1.0 | 1.0 | 0.03 | — | 0.5 | 2330 | 0.55 | +7 ~ −10 | −1.1 |
| 92 | 95.95 | 1.5 | 1.5 | 0.05 | 1.0 | — | 2150 | 0.62 | +6 ~ −9 | −0.8 |
| 93 | 96.3 | 1.5 | 0.5 | 0.1 | 1.5 | 0.1 | 2470 | 0.71 | +5 ~ −5 | −0.6 |

Table 3

| Specimen No. | Composition (mol %) | | | | | $\epsilon$ [20°C] | tan δ (%) [20°C] | rate of temp. variation of $\epsilon$ (%) [−55°C to +125°C] | rate of time variation of $\epsilon$[A$\epsilon$] (%/decade) |
|---|---|---|---|---|---|---|---|---|---|
| | $BaTiO_3$ | $Nb_2O_5$ | $Ta_2O_5$ | $Al_2O_3$ | $In_2O_3$ | | | | |
| 94 | 96.0 | 0.5 | 1.0 | 2.25 | 0.25 | 2130 | 0.38 | +2 ~ −7 | −1.0 |
| 95 | 97.5 | 0.5 | 0.5 | 1.0 | 0.5 | 2380 | 0.45 | +6 ~ −7 | −0.9 |
| 96 | 96.47 | 1.0 | 0.5 | 2.0 | 0.03 | 2280 | 0.45 | +3 ~ −7 | −0.8 |

The specimens numbered 1, 2, 3 and 66 indicate results for compositions outside the scope of the present invention for comparison. Results for specimens 1, 2, 3 and 66 show wide percentage variation of the dielectric constant of the test compositions within the range of temperatures tested. By contrast from Tables 1 to 3, the example specimens numbered 4 through 65 and 67 through 96 have compositions within the scope of the present invention, and these compositions show a relatively smaller variation in dielectric constant with variation in temperature. The rate of variation of dielectric constant with time of these compositions is also small. Moreover, the compositions of the present invention have dielectric constants of sufficiently large values and superior values of dielectric loss ($\tan\delta$).

While almost all of the foregoing examples have been described as employing, as the basic constituent, $BaTiO_3$ in which Ba and Ti are used in equimolecular amounts, similar effects can be achieved utilizing $BaTiO_3$ in which the molecular ratio of Ba to Ti (Ba/Ti) ranges from about 0.9 to 1.1, as shown by the results for specimens 50, 56, 71 and 80 in Tables 1 and 2. The specimens numbered 50 and 71 indicate results for compositions in which the molecular ratio of Ba to Ti (Ba/Ti) is 0.9. While, the specimens 56 and 80 indicate results for compositions in which the molecular ratio of Ba to Ti is 1.1.

We claim:

1. A dielectric ceramic composition having a high dielectric constant, consisting of 77.5 to 99.79 mol % of $BaTiO_3$ 0.1 to 10 mol % of at least one of $Nb_2O_5$ and $Ta_2O_5$, and about 0.01 to 15 mol % of at least one of the compounds $In_2O_3$, $Ga_2O_3$, and $Tl_2O_3$.

2. A dielectric ceramic composition having a high dielectric constant, consisting of 77.5 to 99.79 mol % of $BaTiO_3$, 0.1 to 10 mol % of at least one of $Nb_2O_5$ and $Ta_2O_5$, about 0.01 to 15 mol % of at least one of the compounds $In_2O_3$, $Ga_2O_3$, and $Tl_2O_3$, and about 0.01 to 10 mol % of $Al_2O_3$.

3. A dielectric ceramic composition, having a high dielectric constant, consisting of 77.5 to 99.79 mol % of $BaTiO_3$ as a basic constituent, 0.5 to 5.0 mol % of $Nb_2O_5$ as a sub constituent, and 0.05 to 5.0 mol % of at least one of the compounds $In_2O_3$, $Ga_2O_3$, and $Tl_2O_3$ as another sub constituent.

4. A dielectric ceramic composition, having a high dielectric constant, consisting of 77.5 to 99.79 mol % of $BaTiO_3$ as a basic constituent, 0.5 to 5.0 mol % of $Nb_2O_5$ as one sub constituent, 0.05 to 5.0 mol % of at least one of the compounds $In_2O_3$, $Ga_2O_3$, and $Tl_2O_3$ as a second sub constituent and 0.5 to 5.0 mol % of $Al_2O_3$ as a third sub constituent, the total amount of said sub constituents being within a range of 1.05 to 10 mol %.

5. A dielectric ceramic composition, having a high dielectric constant, consisting of 77.5 to 99.79 mol % of $BaTiO_3$ as a basic constituent, 0.5 to 5.0 mol % of $Ta_2O_5$ as a sub constituent, and 0.05 to 5.0 mol % of at least one of the compounds $In_2O_3$, $Ga_2O_3$, and $Tl_2O_3$ as another sub constituent.

6. A dielectric ceramic composition, having a high dielectric constant, consisting of 77.5 to 99.79 mol % of $BaTiO_3$ as a basic constituent, 0.5 to 5.0 mol % of $Ta_2O_5$ as a sub constituent, 0.05 to 5.0 mol % of at least one of the compounds $In_2O_3$, $Ga_2O_3$, and $Tl_2O_3$ as another sub constituent and 0.5 to 5.0 mol % of $Al_2O_3$ as a further sub constituent.

7. A dielectric ceramic composition having a high dielectric constant, consisting of 77.5 to 99.79 mol % of non-stoichometric $BaTiO_3$ in which the molecular ratio of Ba to Ti lies within the range of approximately 0.9 to 1.1, 0.1 to 10 mol % of at least one of $Nb_2O_5$ and $Ta_2O_5$; and 0.01 to 15 mol % of at least one of the compounds $In_2O_3$, $Ga_2O_3$ and $Tl_2O_3$.

8. A dielectric ceramic composition having a high dielectric constant, consisting of 77.5 to 99.79 mol % of non-stoichometric $BaTiO_3$ in which the molecular ratio of Ba to Ti lies within the range of approximately 0.9 to 1.1, 0.1 to 10 mol % of at least one of $Nb_2O_5$ and $Ta_2O_5$; 0.01 to 15 mol % of at least one of the compounds $In_2O_3$, $Ga_2O_3$ and $Tl_2O_3$; and further including 0.01 to 10 mol % of $Al_2O_3$.

* * * * *